United States Patent [19]

Ballinger

[11] 4,203,419
[45] May 20, 1980

[54] SOLAR CELL

[75] Inventor: Dale O. Ballinger, Denver, Colo.

[73] Assignee: Honeywell Inc., Minneapolis, Minn.

[21] Appl. No.: 806,536

[22] Filed: Jun. 14, 1977

Related U.S. Application Data

[63] Continuation of Ser. No. 647,126, Jan. 7, 1976, abandoned.

[51] Int. Cl.² ................................................. F24J 3/02
[52] U.S. Cl. .................................... 126/430; 350/267; 126/400; 126/439
[58] Field of Search ................. 126/270, 271; 350/267

[56] References Cited
U.S. PATENT DOCUMENTS

| 3,257,903 | 6/1966 | Marks | 350/267 |
| 3,683,382 | 8/1972 | Ballinger | 360/56 |

*Primary Examiner*—Robert E. Garrett
*Attorney, Agent, or Firm*—Laurence J. Marhoefer; Lockwood D. Burton; Mitchell J. Halista

[57] ABSTRACT

A solar cell has a heat collector bar with a heat absorbing material in contact therewith. The heat absorbing material includes a transparent web member having a plurality of capsule uniformly distributed therein with each capsules having a suspension of highly reflective, flake-like, field responsive particles therein. The particles may be preoriented with respect to incident electromagnetic radiation.

5 Claims, 2 Drawing Figures

SOLAR CELL

This is a continuation of application Ser. No. 647,126, filed on Jan. 7, 1976, now abandoned.

BACKGROUND OF THE INVENTION

1. Field of the Invention

The present invention relates to energy converters. Specifically, the present invention is directed to energy converters for converting incident electromagnetic energy into thermal energy.

2. Description of the Prior Art

The contemporary interest in energy converters, particularly solar energy converters has been increased by shortages in conventional energy sources such as oil, coal, etc. While the use of so-called solar converters is well known, the conventional solar converter suffers from an inherent lack of efficiency in converting the incident electromagnetic energy, i.e., light, into thermal energy. Thus, in order to provide energy for house heating, steam generation, etc. the conventional inefficient solar converter is dependent on the use of a relatively large area for collecting the incident electromagnetic energy. Conversely, prior art attempts to improve the conversion efficiency, such as focusing of the incident energy are effective to produce higher temperatures but use bulky structures which are inappropriate for uses such as house heating wherein the solar converter is to be unobtrusively integrated into the design of the surrounding house or other structure. Accordingly, an improvement in the efficiency of conventional solar converters would permit the use of significantly smaller converter units which would decrease the initial cost of a solar converter as well as improving its operation while allowing the smaller physical size to be more readily incorporated into a house or other structure.

SUMMARY OF THE INVENTION

Accordingly, an object of the present invention is to provide an improved solar converter apparatus.

BRIEF DESCRIPTION OF THE DRAWINGS

A better understanding of the present invention may be had when the following detailed description is read in connection with the accompanying drawings in which.

DESCRIPTION OF THE PREFERRED EMBODIMENT

Detailed Description

Figure 1:
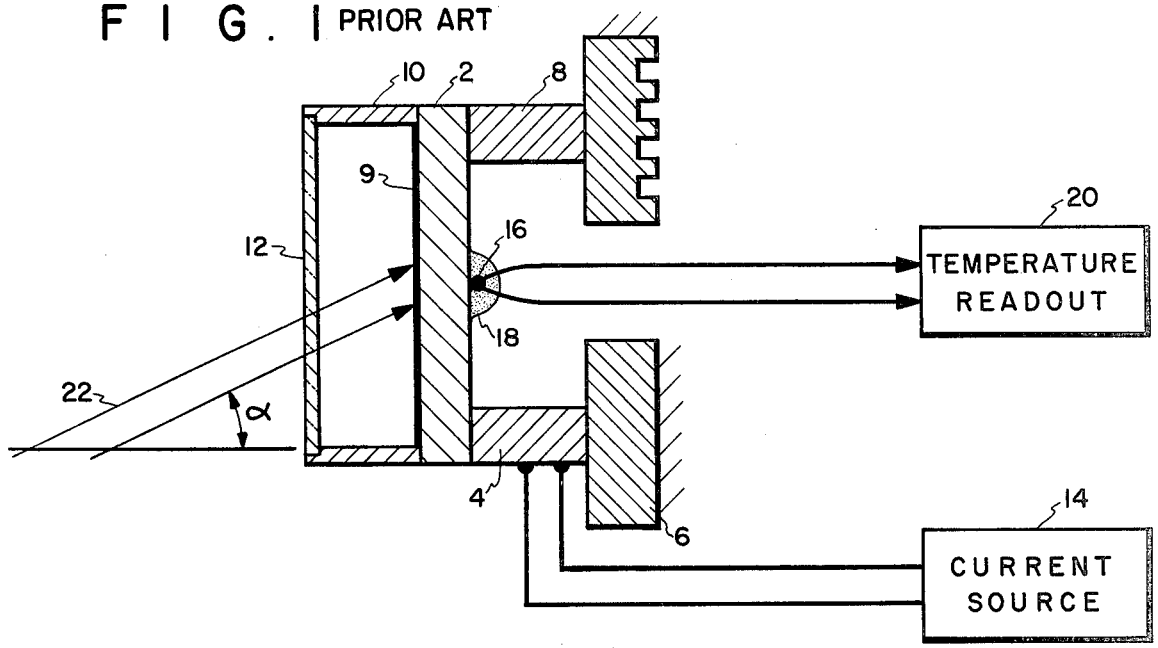
FIG. 1 is a pictorial illustration of a conventional solar converter and conversion testing system and FIG. 2 is a pictorial illustration of a solar converter and conversion testing system embodying the present invention.

Referring to FIG. 1 in more detail, there is shown a conventional solar converter and conversion testing system having a heat, or thermal energy, collector bar 2, e.g., brass shim stock. The collector bar 2 is supported at one end by a testing system including a cooling means 4 for extracting thermal energy from the collector bar 2 in a controllable fashion whereby the thermal energy available from the collector bar 2 can be measured. For example, the support 4 may be a so-called Peltier cooler, such devices being well-known in the art. A description of a Peltier cooler for cooling, or heat-pumping, is described in the June 15, 1972 issue of "Machine Design" on pages 105 to 109. The Peltier cooler is, in turn, supported on a support base 6. The other end of the collector bar 2 is supported by a heat sink assembly 8. One surface of the collector bar 2 is covered with a heat absorbing coating 9 to assist in absorbing the energy from incident electromagnetic energy, e.g., an electroplated "black nickel" coating. An air-tight structure consisting of an open end cylinder or box 10 is attached to the collector bar 2 by any suitable means (not shown) to encompass the coating. The open end of the box 10 is covered by a transparent cover 12, e.g., glass. An adjustable current source 14 is provided for selectively energizing the Peltier cooler 4. A thermistor element 16 is attached by an adhesive 18 to the under side of the collector bar 2, i.e., on the opposite face from the coating thereon. The thermistor 16 is connected to a temperature readout apparatus 20 which may be any suitable device for providing an indication of the operation of the thermistor and converting it to a visible indication of the temperature of the collector bar 2. The solar cell test apparatus shown in FIG. 1 was arranged to receive incident electromagnetic radiation 22 at an angle α through the transparent cover 12. The angle of the radiation 22 was measured with respect to a perpendicular line extending from the surface of the collector bar 2 having the heat absorbing coating 9 thereon. The current source 14 is adjusted to operate the Peltier cooler 4 to provide a constant predetermined temperature of the collector bar 2 as detected by the thermistor 16. This temperature is indicated by a readout on the temperature measuring apparatus 20.

Figure 2:
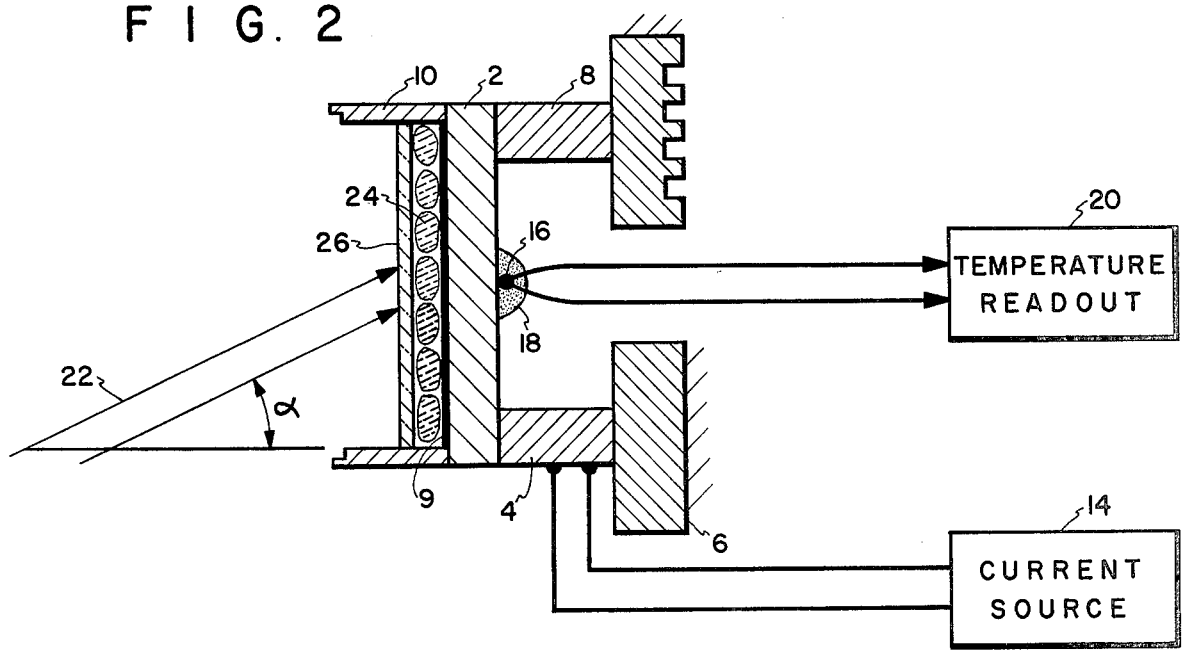

Referring now to FIG. 2, a somewhat similar test apparatus to that shown in FIG. 1 is employed with the removal of the transparent cover 12 and the substitution thereof by a sheet of a radiation admitting material having capsules distributed therein with highly reflective, flake-like particles suspended in a radiation admitting liquid within each capsule. This material is described in detail in U.S. Pat. No. 3,683,382 assigned to the assignee of the present invention. Basically, it uses capsules containing a suspension medium, e.g., oil, in which the highly reflective, flake-like particles are distributed with a plurality of particles being located within each capsule. The surrounding web member, the capsule walls and the suspension medium may be selected to admit the expected incident radiation, e.g., for visible light, these elements would be substantially transparent. The particles may be of a magnetic material which are capable of being oriented into any three-dimensional position using an applied magnetic field. A rotating magnetic field producing means for aligning the particles is shown in U.S. Pat. No. 3,879,754, also assigned to the assignee of the present invention.

The radiation absorbing material having the capsules with highly reflective, flake-like particles therein is shown as a flat sheet 24 which has one side in contact with the heat absorbing coating 9 on the bar 2. The other side of the sheet 24 is covered with a radiation admitting layer, or cover, 26 of a protective material, e.g., a transparent plastic. For purposes of testing the solar cell shown in FIG. 2, the incoming electromagnetic radiation 22 is directed against the transparent cover 26 at the same angle α as was used in testing the conventional solar cell structure illustrated in FIG. 1.

MODE OF OPERATION

Referring to the conventional solar cell structure shown in FIG. 1, the incoming radiation 22 is absorbed by the heat absorbing coating 9 whereby the temperature of the thermal collecting bar 22 is raised. The output current from the current source 14 is selectively varied to produce a cooling effect by the Peltier cooler 4. The temperature of the collecting bar 22 is read out from the thermistor 16 by the temperature readout device 20. The current required to operate the Peltier cooler 4 is a measure of the heat being absorbed by the solar cell from the incident radiation 22. The conventional solar cell has a low conversion efficiency due to reflection from the heat absorbing coating 9 coupled with convection and conduction losses within the enclosure 10.

The conventional solar cell of FIG. 1 is subsequently replaced for testing purposes by the novel solar cell embodiment shown in FIG. 2. Specifically, the transparent cover 12 is removed and the heat absorbing coating 9 is covered with the sheet 24 of the radiation absorbing material containing capsules having a suspension of highly reflective flake-like particles therein. The angle $\alpha$ of the incident radiation 22 is maintained the same as that used in testing the conventional solar cell structure of FIG. 1. Silicon grease may be used between the material 12 and the heat absorbing coating 9 to improve the heat transfer from the material 24 to the collecting bar 2 and heat absorbing coating 9. Using the same level of the incident radiation 22, the current source 14 is adjusted to provide a cooling effect sufficient to maintain the temperature of the collecting bar 2 at the temperature reached using the conventional structure of FIG. 1. In an operating prototype of the solar cell and test system shown in FIG. 2, the source of incident radiation was a 150 watt projector lamp mounted about twelve inches from the solar cell at an angle of 30° with respect to a perpendicular to the surface of the bar 2 coated with the heat absorbing coating 9. Using this test setup for providing the incident radiation, the current source 14 was required to supply approximately 26.5% greater current to the Peltier cooler 4 to maintain the same temperature of the collector bar 2 than was necessary with the conventional solar cell arrangement of FIG. 1. This increase would indicate a conversion efficiency improvement of approximately this amount. This improvement in conversion efficiency is believed to be the result of a greater degree of entrapment of the incident radiation by the internal reflection within the material 24 as well as a reduction in convection and conduction losses.

The initial orientation of the reflective flakes may be selected to coincide with the angle $\alpha$ of the incident radiation 22 to maximize the penetration of the radiation into the radiation absorbing material 24. In an actual installation of the novel solar cell of FIG. 2, the flakes could be preorientated at a predetermined angle correlated to the average installation angle of the solar cell and incident solar energy. On the other hand, if desired a system (not shown) for reorientating the flakes within the material 12 could be used on a timed repetitive basis to even more closely match the changing angle of the solar radiation during the day with a possible further increase in the overall conversion efficiency. The power required to occasionally reorient the flakes in the material 24 is very small and could be supplied with only a negligible effect on the overall efficiency of the solar conversion provided by the improved solar cell of FIG. 2.

Accordingly, it may be seen that there has been provided, in accordance with the present invention, an improved solar converter apparatus.

The embodiments of the invention in which an exclusive property or privilege is claimed are defined as follows:

1. A solar cell comprising
   a thermal energy collecting means having at least one generally planar surface and
   a thermal energy absorbing means in thermal energy transfer contact with said planar surface of said thermal energy collecting means and exposed to incident electromagnetic energy to be converted into thermal energy, said thermal energy absorbing means including an electromagnetic energy admitting web member having a plurality of electromagnetic energy admitting capsules substantially uniformly distributed therein with each capsule containing an electromagnetic energy admitting fluid medium and a suspension of a plurality of magnetic field responsive, flake-like, and highly reflective particles in said medium and uniformly oriented and retained at an angle of less than 90° with respect to said planar surface.

2. A solar cell as set forth in claim 1 wherein said heat collecting means is a metallic bar having a absorbing layer thereon between said bar and said thermal energy absorbing means.

3. A solar cell as set forth in claim 2 wherein said heat collecting means is a brass bar and said absorbing layer is a black nickel coating thereon.

4. A solar cell as set forth in claim 1 wherein said thermal energy absorbing means includes an electromagnetic energy admitting protective layer covering said web member between said web member and the incident electromagnetic energy.

5. A solar cell as set forth in claim 4 wherein said thermal energy collecting means includes a layer of silicon grease uniformly distributed between said thermal energy collecting means and said thermal energy absorbing means to improve the transfer of thermal energy from said thermal energy absorbing means to said thermal energy collecting means.

* * * * *